United States Patent [19]

Golobay

[11] 4,193,318

[45] Mar. 18, 1980

[54] BRAKE LEVER

[75] Inventor: Gary L. Golobay, Augusta, Kans.

[73] Assignee: Conchemco, Incorporated, Lenexa, Kans.

[21] Appl. No.: 872,809

[22] Filed: Jan. 27, 1978

[51] Int. Cl.$^2$ ............................................. G05G 11/00
[52] U.S. Cl. ................................ 74/489; 74/501.5 R;
[58] Field of Search ............... 74/489, 501.5 R, 501 R, 74/501 P, 491, 488, 486

[56] References Cited

U.S. PATENT DOCUMENTS

| 4,005,613 | 2/1977 | Kaufman et al. | 74/489 |
| 4,156,371 | 2/1979 | Juy | 74/501 R |

FOREIGN PATENT DOCUMENTS

| 336886 | 6/1904 | France | 74/489 |
| 374727 | 3/1907 | France | 74/489 |
| 460106 | 11/1913 | France | 74/489 |
| 471094 | 10/1914 | France | 74/489 |
| 955674 | 1/1950 | France | 74/489 |
| 1034557 | 7/1953 | France | 74/489 |
| 1035543 | 8/1953 | France | 74/489 |
| 12199 | 7/1900 | United Kingdom | 74/489 |

*Primary Examiner*—Samuel Scott
*Assistant Examiner*—G. Anderson

*Attorney, Agent, or Firm*—Schmidt, Johnson, Hovey & Williams

[57] ABSTRACT

A manually operated, cable control lever assembly especially adapted for use with a handlebar grip is provided with an elongate lever having one end thereof pivotally mounted to a support bracket which also restrains the movement of the control cable in a direction generally aligned with the lever. The lever is provided with: an essentially straight, internal cavity extending longitudinally therethrough and providing a first access opening in the free end of the lever; an attenuated, internal passageway in communication with the cavity and diverging away from the latter toward the free extremity of the lever and terminating in a second, recessed access opening; and, an access slot extending between the access openings and into the passageway. The end of a typical control cable provided with a keeper element is installed in the lever assembly by threading the keeper element through the cavity and out the first access opening and into the second access opening while the cable itself passes through the slot into operative position within the passageway. With the cable thusly installed, the end thereof is secured to the lever member at a point on the latter substantially spaced from the pivoting end thereof in order to place intermediate stretches of the lever member in force compression when the lever member is operated.

2 Claims, 8 Drawing Figures

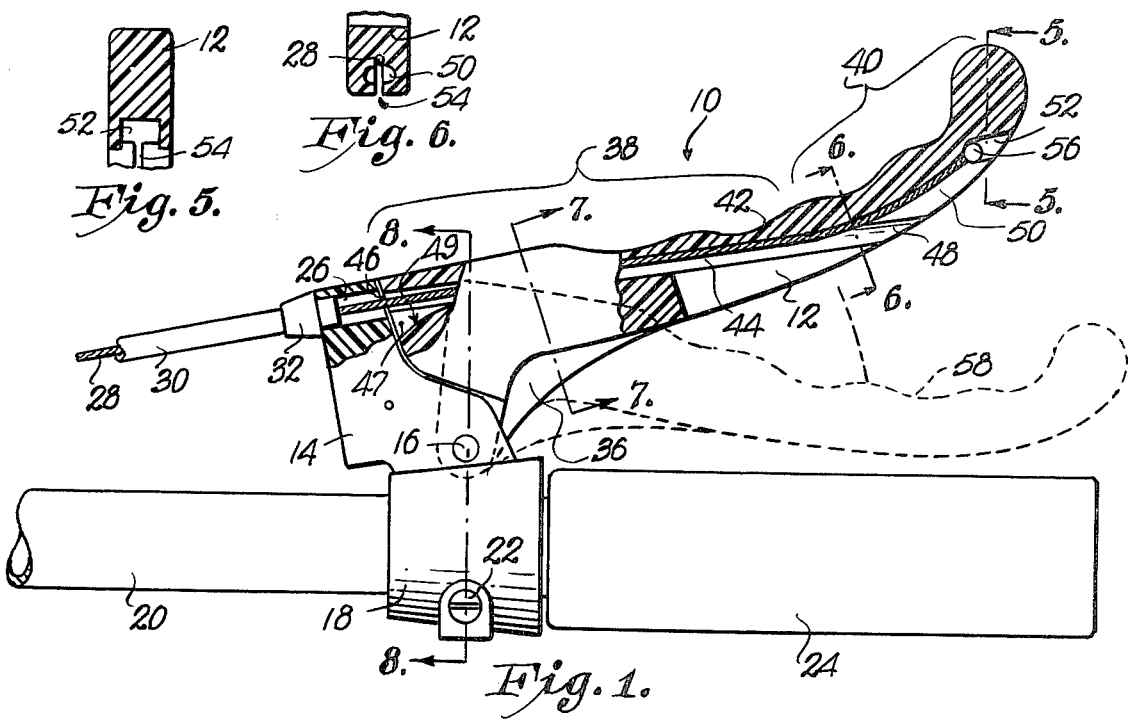
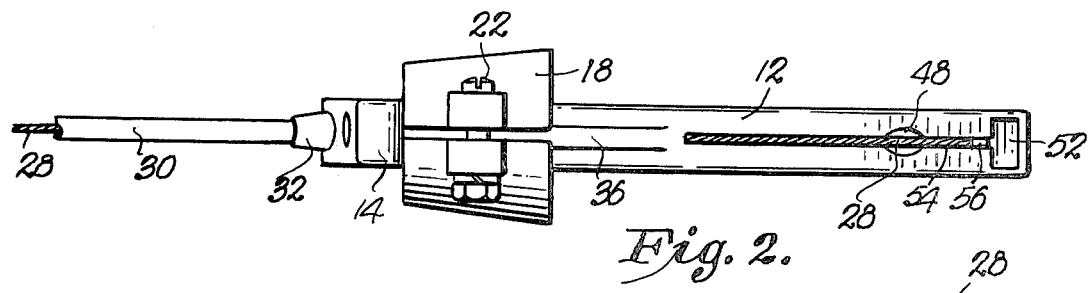
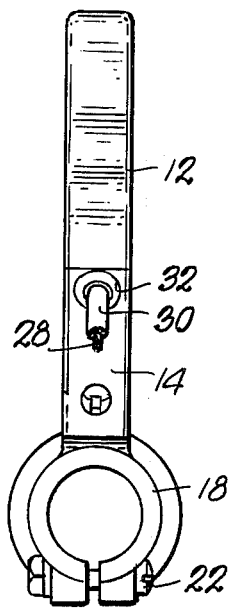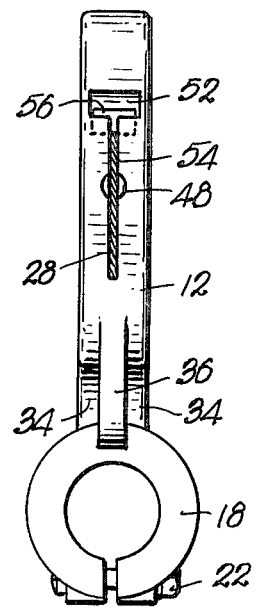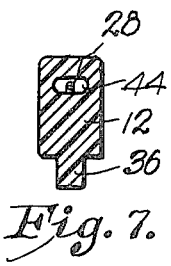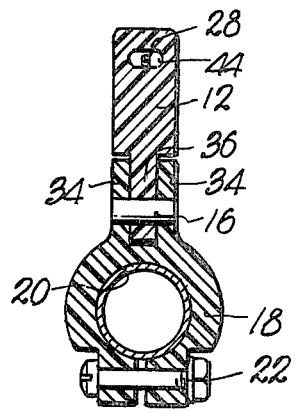

BRAKE LEVER

TECHNICAL FIELD

The invention generally deals with mechanical lever assemblies of the type used for manipulating control cables and deals more particularly with an improved construction for releasably attaching a control cable to the lever.

BACKGROUND ART

Lever mechanisms for manipulating control cables are commonly employed in motorcycles and like vehicles to permit operator control of the vehicle's brakes and clutch mechanism. A typical lever and cable combination, such as that disclosed in U.S. Pat. No. 3,733,922, includes a handlebar mounted support bracket having one end of an elongate lever pivotally fastened thereto and a barrel portion through which a cable is trained to maintain shifting movement of the cable in a direction generally aligned with the longitudinal axis of the lever. The cable normally has a keeper element secured to the end thereof which is releasably received within a recessed portion in the lever adjacent the pivoting end of the latter. Thus, the end of the cable is fastened to the pivoting end of the lever and in some cases, the pivot point of the lever may be slightly longitudinally spaced toward the free end of the lever and away from the location of cable attachment. In the type of lever and cable attachment designs described above, manipulation of the lever by the vehicle operator results in substantial tension forces as a result of the bending load being applied to the length of the lever member; consequently, the lever must be constructed in the manner to withstand these substantial tension forces, thereby limiting the classes of material and structural designs which may be employed in connection with the fabrication of the lever.

DISCLOSURE OF INVENTION

The present invention provides a novel lever structure having one end thereof adapted to be pivotally mounted on a support bracket and includes a passageway extending longitudinally throughout essentially the entire length thereof, through which passageway a cable including a keeper element on the end thereof may be passed in order to attach the end of the cable to the free, outer extremity of the lever, thereby placing intermediate stretches of the lever in a state of compression upon operation of the lever member by the vehicle operator. The free extremity of the lever further includes a pair of access openings connected by a slot to allow simple, rapid threading and securement of the keeper element into a recessed area adjacent the free extremity of the lever, thereby eliminating the need to pass the entire length of the cable through the lever during cable installation.

BRIEF DESCRIPTION OF THE DRAWINGS

In the drawings:

FIG. 1 is a longitudinal, cross-sectional view of the lever assembly shown in operative relationship to a portion of a handlebar and grip assembly which forms the preferred embodiment of the present invention, full lines indicating the normal rest position of the lever, the operated position of the lever being depicted in the phantom;

FIG. 2 is a longitudinal view of the lever assembly shown in FIG. 1;

FIG. 3 is an elevational view of one end of the lever assembly shown in FIG. 2;

FIG. 4 is an elevational view of the opposite end of the lever assembly;

FIG. 5 is a cross-sectional view taken along the line 5—5 in FIG. 1;

FIG. 6 is a cross-sectional view taken along the line 6—6 in FIG. 1;

FIG. 7 is a cross-sectional view taken along the line 7—7 in FIG. 1; and

FIG. 8 is a cross-sectional view taken along the line 8—8 in FIG. 1.

BEST MODE FOR CARRYING OUT THE INVENTION

Referring now the drawing, a lever assembly generally indicated by the numeral 10 includes a lever or handle portion 12 having one extremity thereof pivotally fastened by pin 16 to the support bracket 14. A collar portion 18 of the bracket 14 clamps around the handlebar 20 by means of screw assembly 22, and a handle grip member 24 is sleeved over the end of handlebar 20 and opposes the lever 12. The bracket 14 includes a guide barrel 26 through which a cable 28 is trained, the cable 28 being shiftable through a stationary sleeve 30 secured by retainer 32 to the bracket 14, while a bifurcated portion 34 of the bracket 14 defines a slot within which a rib area 36 of the lever 12 is shiftably disposed.

Lever 12 includes an essentially straight stretch, 38 and a slightly arcuate portion 40 adjacent the free outer extremity thereof, and further includes an undulating surface area 42 between the opposite extremities thereof to conform with the operator's fingers. Lever 12 is provided with an essentially straight, longitudinally extending cavity or passageway 44 presenting an opening 46 in communication with the barrel 26, and an access opening 48 adjacent the free extremity of lever 12, the purpose of which access opening 48 will become clearly apparent later in the discussion. A cut-out portion 47 in the lever 12 adjacent the opening 46 forms an arcuately shaped cable ramp surface 49 which extends from the passageway 44 down into the lever 12 generally toward the pivot pin 16. A second internal cavity or passageway 50 is in communication with the passageway 44 and extends from the latter adjacent the outer extremity of lever 12 in a direction away from the passageway 44 and toward the free end of the lever 12. The cross-sectional area of passageway 50 is somewhat attenuated in comparison with the cross sectional area of passageway 44 and feeds into a recessed area 52 which includes an opening presenting a rectangular cross section to the exterior area surrounding the free end of lever 12. A slot 54 is provided in the lever 12 which extends from surface areas of the latter down into the passageway 50 and between the openings 48 and 52.

When installed in the lever 12, as depicted in FIG. 1, the cable 28 is disposed within the barrel 26 and extends essentially throughout the entire length of the lever 12, through opening 46, passageway 44, thence passageway 50 to a position adjacent the recessed area 52. A keeper means 56, herein depicted as a generally cylinderically shaped fitting, is secured to the end of cable 28 and is adapted to be received and retained within the recessed area 52. The keeper means 56 is of a cross section incompatible with the cross section of passageway 50 whereby to prevent the passage of keeper element 52 therethrough, consequently the end of the cable 28 is fastened to the free outer extremity of lever 12, and more particularly is retained adjacent the recessed area 52. It is particularly important to note that the barrel 26, passageway 44, and recessed area 52 possess cross section configurations of a class to allow the keeper means 56 to freely pass therethough, while the attenuated, passageway 50 only allows free passage of the cable 28 while preventing passage of the keeper means 56.

In use, the novel lever assembly 10 not only provides a unique construction for attaching the cable 28 to the lever 12, but does so in a manner to provide significantly improved operating results. Assuming first that the cable 28 is to be installed in the lever assembly 10, the keeper means 56 and attached cable 28 is first passed through the barrel 26 and opening 46 into the passageway 44, and finally out through the opening 48. The portion of the cable 28 adjacent the keeper means 56 is then drawn through the slot 54 whereupon the keeper means 56 may be inserted into the recessed area 52, and into an operative fastening position adjacent the passageway 50. As the keeper means 56 is inserted within the recessed area 52 and the slack in the cable 28 is taken up, the cable 28 adjacent the keeper means 56 is drawn into the passageway 50 and is maintained therewithin as a result of constantly applied tension within the cable which results from the cable 28 being urged away from the lever assembly 10 by biasing means (not shown) associated with the mechanism controlled by the lever assembly 10. With the cable 28 thusly installed in the lever assembly 10, it can be appreciated that the sole point of attachment of the cable 28 is a location adjacent the free extremity of the lever 12, and that the cable 28 is trained through essentially the entire length of the lever 12 and is confined therewithin, so that a portion of the tension created in the cable 28 when the lever 12 is shifted from a normal rest position to an operated position indicated by the numeral 58, a force is imposed upon the free outer extremity of the lever 12 in a direction generally aligned with the longitudinal axis of the passageway 44, and a significant force component of the mentioned tension force is directed toward the point of pivotal attachment of the lever 12 to the structure 14, namely the pin 16. Consequently, it is readily apparent that the structure 14 imparts an equal, but oppositely directed force upon the lever 12 so that a pair of force components acting on opposite extremities of the lever 12 and in opposite directions is created, thereby tending to place intermediate stretches of the lever 12 in a state of force compression. Moreover, due to the fastening of the end of the cable 28 in the arcuate portion 40 of the lever 12, the resultant compressive force component directed from the free extremity of the latter toward the pin 16 is increased. This is a particularly important feature of the invention since most materials selected for use in the manufacture of the lever 12 are better able to withstand compressive forces in contrast to tension and bending type forces normally experienced by prior art lever constructions. Finally, it is important to observe that as the lever 12 is pivoted from its normal rest position to its operated position 58, the cable ramp surface 49 is drawn into slidable engagement with, and conformably contacts, a stretch of the cable 28 adjacent the opening 46 and presents a gently curving contact surface which tends to minimize bending stresses in the cable 28 and distributes frictional forces between the cable 28 and the pivotally mounted end of the lever 12 in a manner to allow essentially free sliding movement of the cable 28 and reduce wear and fatigue of the latter. By this feature of the invention, a maximum magnitude of tension force is communicated to the free, outer extremity of the lever 12.

In the event that the cable 28 is to be removed from the lever assembly 10, tension is first relieved from the cable 28 and the keeper means 56 is withdrawn from the recessed area 52. The cable 28 then may be withdrawn from the passageway 44 whereupon the keeper means 56 slides through the opening 48, thence passageway 44 through opening 46 and barrel 26 to effect the simple and rapid removal of the cable 28.

INDUSTRIAL APPLICABILITY

The utility and method of use of the improved lever assembly are made apparent from the foregoing description of the invention. The lever 10 may be made from any of numerous materials including plastic or metal alloy materials in which case the lever 10 may be manufactured by molding or the like. It is clear that the lever 10 may be used in connection with existing designs of bracket structures, such as the bracket structure 14 disclosed herein and is further readily adapted for use with known cable designs. It is important to observe however, that the cross-sectional configuration of passageways 44 and 50, as well as the recessed area 52, may be altered in particular applications to suit the particular geometry of the keeper means 56 associated with cable 28.

From the foregoing, it is clear that the invention provides especially effective means for attaching a control cable to a lever assembly in a manner which maintains the lever in a state of compression but which does so in a manner to allow rapid, simple installation and removal of the control cable from the lever assembly. It is recognized, of course, that those skilled in the art may make various modifications or additions to the preferred embodiment chosen to illustrate the invention without departing from the gist and essence thereof. Accordingly, it is to be understood that the protection sought and to be afforded hereby should be deemed to extend to the subject matter claimed and all equivalents thereof fairly within the scope of the invention.

What is claimed and desired to be secured by Letters Patent is:

1. In a manually operated control lever assembly of the type including the combination of a support bracket secured to a handlebar or the like, an elongate lever member having one extremity thereof pivotally mounted on said support bracket and a shiftable control cable having one end thereof fastened to said lever member and biased away from said one extremity of said lever member in a direction generally aligned with the longitudinal axis of the latter, the improvement comprising:

means associated with said lever member for confining a portion of the length of the control cable along the length of the lever, said cable portion being substantially longitudinally coextensive with said lever member and having said one end thereof attached to said lever member adjacent the opposite extremity of the lever;

said means for confining the cable along the length of the lever including a first internal passageway in said lever and a second internal passageway in said lever communicating with the first passageway;

said lever member having an essentially straight stretch adjacent said one extremity thereof, said first passageway being substantially within said straight stretch and conforming thereto, and an arcuate stretch adjacent said opposite extremity thereof, said second passageway being substantially within said arcuate stretch and conforming thereto, whereby to produce a first curvature of the cable adjacent said opposite extremity of the lever member;

said cable portion functioning to transmit a tension force on said opposite extremity of the lever whereby to impose a compressive force on said lever member intermediate said extremities thereof;

said lever member further including an arcuately shaped cable ramp surface in said first passageway adjacent said one extremity of the lever and slidably engageable with a stretch of said control cable portion when the lever is operated whereby to produce a second curvature of the cable adjacent said one extremity and maximize the tension force upon the opposite extremity of the lever and thus the compressive force upon the lever intermediate its ends.

2. A mechanical control assembly comprising: a length of flexible control line;

an elongate lever member for manipulating said control line and having a pivoting extremity and a free extremity, said lever member having an elongate passageway therewithin extending substantially throughout the entire length thereof from adjacent said one pivoting extremity thereof to adjacent said free extremity thereof, a portion of the length of said control line being trained through said passageway and shiftably confined within the latter; and means for fastening one end of said control line adjacent said portion thereof to said lever member adjacent said free extremity of the latter, said fastening means including a keeper element secured on said one end of said control line, said passageway comprising a cross section configuration of a type to allow said keeper element to pass therethrough, said lever member including;

a first opening in surface portions thereof adjacent said free extremity and in communication with said passageway, a second opening in surface portions thereof longitudinally spaced from said first opening and toward said free extremity, a recessed portion therein communicating with said second opening and adapted to receive said keeper element therewithin, a slot extending from surface portions of said lever member into said passageway and between said first and second openings, said first and second openings having cross sectional configurations of a type to allow passage of said keeper element therethrough, said slot having a cross section configuration of a type to allow passage of said control line therethrough but preventing passage of said keeper element.

* * * * *